March 19, 1968 V. E. GOUGH 3,374,131
METHOD OF BUILDING A PNEUMATIC TIRE
Filed Oct. 15, 1963 6 Sheets-Sheet 1
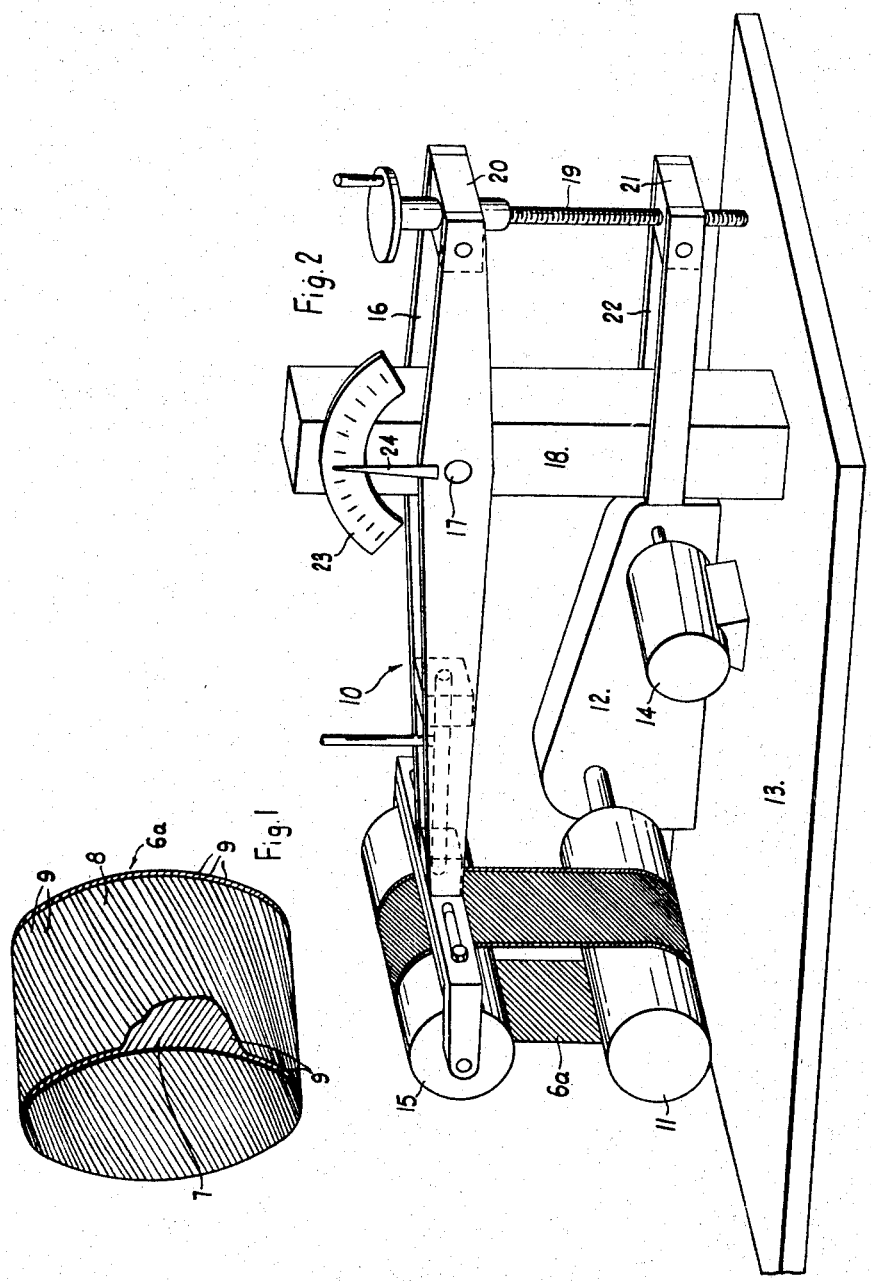
Inventor:
Vernon Eric Gough
by Benj. T. Rauber
attorney

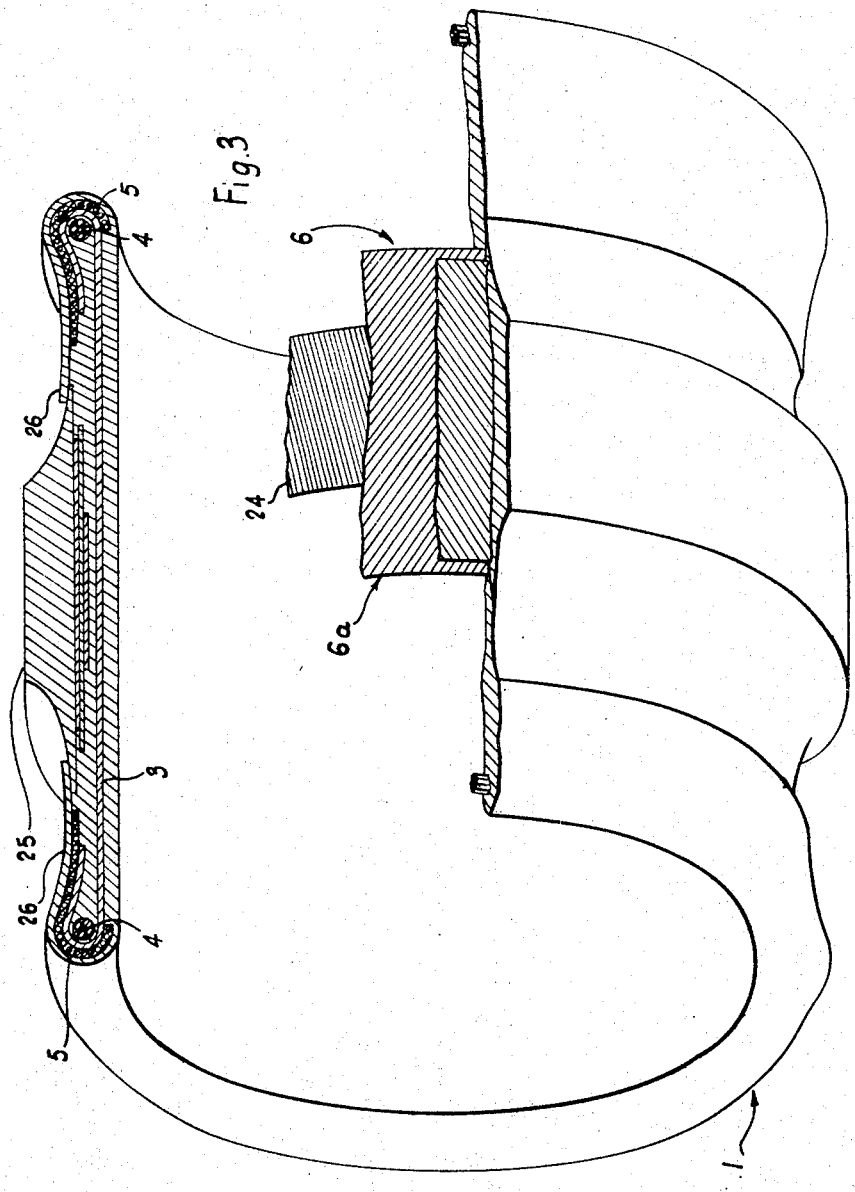

March 19, 1968 V. E. GOUGH 3,374,131
METHOD OF BUILDING A PNEUMATIC TIRE
Filed Oct. 15, 1963 6 Sheets-Sheet 6

Inventor:
Vernon Eric Gough
by Benj. T. Rauber
attorney

United States Patent Office 3,374,131
Patented Mar. 19, 1968

3,374,131
METHOD OF BUILDING A PNEUMATIC TIRE
Vernon Eric Gough, Sutton Coldfield, England, assignor to Dunlop Rubber Company Limited, county of London, England, a British company
Filed Oct. 15, 1963, Ser. No. 316,346
7 Claims. (Cl. 156—133)

This invention relates to the manufacture of pneumatic tires.

A pneumatic tire is normally built from carcass plies and breaker layers—both hereinafter referred to, for convenience as "plies"—of rubberised parallel cord fabric comprising cords of material which are relatively inextensible compared with rubber, e.g., steel, rayon or nylon. These plies are usually formed into cylindrical pockets, each pocket consisting of two superimposed plies formed into a cylinder.

The cords of the plies forming the pockets are disposed at an angle to the circumferential direction of the cylindrical pocket known as the "bias angle," the cords of one ply being disposed at an opposite bias angle to that of the cords of the other ply, and the cords of the two plies thus crossing one another in the assembled pocket. Pockets as defined above may be employed in the production of a tire carcass, and may also be used to form a tread reinforcement.

In one method of tire building, the tire is built on a cylindrical drum and is afterwards shaped to toroidal form before being moulded and vulcanised. In shaping the tire it is necessary for the plies of the tire carcass and tread reinforcement to be stretched so that, after shaping, all portions of the carcass, with the exception of those portions adjacent to the bead wires, and all portions of the tread reinforcement, are disposed at a greater diameter than that at which they are disposed in the unshaped tire. In order to achieve this stretch, the cords of each of the plies forming the pockets undergo a "trellising" or "scissoring" action relative to the cords of an adjacent ply, the bias angle of the cords changing during this action to a lower value.

When a tire, having a reinforcement containing cords disposed at bias angles of less than 45° in the unshaped state of the tire, is shaped from cylindrical to toroidal form, the trellising of the cords results in a decrease in the lateral spacing between adjacent cords, rubber being squeezed from the area between the cords to enable this reduction in spacing to take place. The resistance to trellising of the cords, set up by the rubber between the cords, greatly increases as the bias angle of the cords decreases, and when cords having finished bias angles of less than 30° are required in the portions of the carcass near to or in the tread region of the tire, or in the tread reinforcement, it is not normally possible to shape the tire from cylindrical to toroidal form. Tires of this type are usually built on high-crown formers, that is, formers approximating in shape more closely to the toroidal form of the finished tire; or where the tread reinforcement only is required to have a low bias angle the tread reinforcement may be applied to the carcass after shaping of the carcass.

According to the invention, a method of building a pneumatic tire incorporating a strip or pocket having at least two layers of rubberised parallel cords, the cords in each layer being disposed in the crown region in the finished tire at a finished bias angle of between 5° and 30° to a circumferential line of the tire crossing the cords at a point under consideration, comprises initially forming said strip or pocket from layers in which the cords are disposed at bias angles substantially equal to the complementary angle to said finished bias angle, the cords of one layer crossing the cords of the other layer, and stretching said strip or pocket, respectively, in the longitudinal or circumferential direction of said strip or pocket until the bias angles of the cords of the two layers are reduced to said finished bias angle.

In the construction of a tire incorporating the strip or pocket as, or part of, a tread reinforcement the cords of which are disposed at bias angles, in the finished tire, of between 5° and 30° to a circumferential line of the tire crossing the cords at the point under consideration, the strip or pocket is first made with its cords disposed at a bias angle substantially equal to the complementary angle to the desired finished bias angle, and, respectively, of length or diameter less than the maximum circumferential length or outside diameter of the carcass of the tire upon the former, the strip or pocket then being stretched to the said length or diameter of the carcass before being applied thereto. In the method of construction, the carcass may be built in an unshaped or partially shaped condition upon a cylindrical or high or low crown former, and, after applying the strip or pocket to the carcass, the carcass may be shaped into a toroidal condition.

Alternatively, where the strip or pocket is used for incorporation into the tire as, or part of, a tread reinforcement, the tire carcass may be built in an unshaped or partially shaped condition upon a former, the strip or pocket being stretched respectively to substantially a length or diameter corresponding, respectively, to a finished circumferential length or diameter of the tread reinforcement in the tire before moulding, and disposed in annular form coaxially and symmetrically around the tire carcass before shaping the carcass into toroidal condition and into engagement with the strip or pocket.

In a construction of a tire incorporating the strip or pocket as, or part of, a carcass reinforcement, the strip or pocket may be initially formed respectively with a length or diameter less than the maximum circumferential length or outside diameter of a former or of part of the carcass of the tire already built thereon, the strip or pocket then being stretched to said length or diameter of the former or of said part so as to enable the strip or pocket to be applied thereto.

The width of a strip or pocket, and the length or diameter, respectively, of said strip or pocket, for use in the method according to the invention are chosen so that when the strip or pocket is stretched to the length or diameter, respectively, which it will assume in the finished tire, the width of the strip or pocket and the bias angle of its cord are of the desired value.

The bias angle of the cords in the initial state of the strip or pocket may be exactly equal to the complement of the desired final bias angle, or in a modification of the method defined above, which results in advantages being obtained from the invention, initial bias angles somewhat larger or smaller than said complement may be employed, for example, angles within a range from 10° above to 10° below the complement.

In the method according to the invention advantage is taken of the fact that when a two ply strip or pocket of rubberised parallel cord fabric is made from cords disposed at bias angles greater than 45°, the action of stretching the strip or pocket, and the consequent trellising of the cords results in an increase in the space between the cords as the bias angle is reduced, until the angle of 45° is reached. This increase in cord spacing results in a stretching or thinning of the rubber in which the cords are embedded. When the pocket is then further stretched to reduce the bias angle of its cords from the value of 45° to a lower angle, since the rubber between the cords has already been stretched or thinned by the trellising of the cords in their reduction from a higher angle to 45°, the subsequent decrease in cord spacing is able to take place without rubber being forced from between the cords, and thus the resistance set up by the rubber to trellising of the cords is greatly reduced compared with that set up in the conventional process.

The invention also includes a pneumatic tire produced by a method as defined in any of the preceding paragraphs.

Embodiments of the invention will now be described, by way of example, with reference to the accompanying drawings in which:

FIGURE 1 shows a first embodiment of the invention and is an isometric view of a two steel cord layer tread reinforcement pocket for incorporation into a pneumatic tire, the pocket being partially cut away to show further details thereof;

FIGURE 2 is an isometric view of the pocket shown in FIGURE 1 mounted upon apparatus for stretching it in a circumferential direction;

FIGURE 3 is a isometric view of a tire carcass in a cylindrically built condition, the carcass incorporating the pocket of FIGURES 1 and 2 and being sectioned axially in steps to show details of the carcass;

Figure 4:
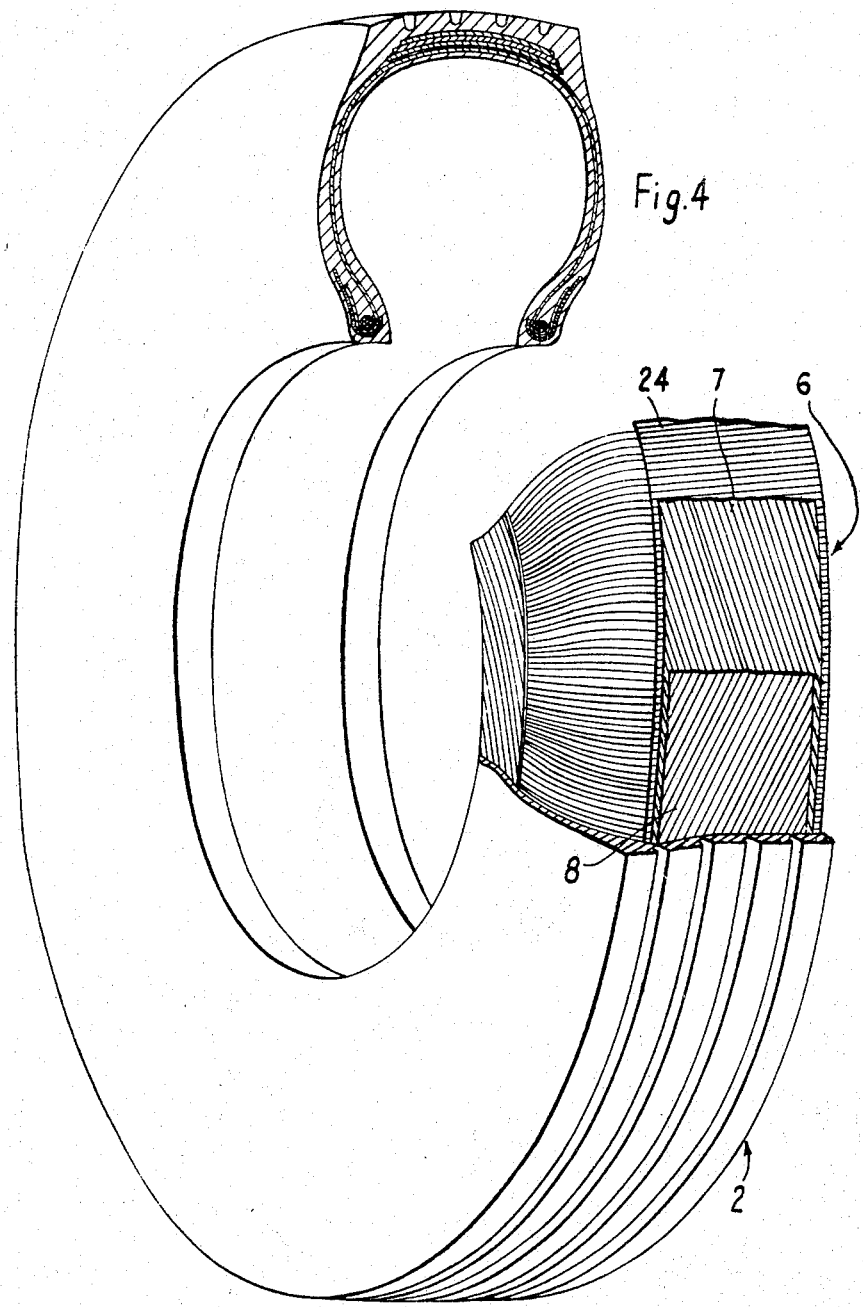
FIGURE 4 is a view similar to FIGURE 3 of the carcass of FIGURE 3 after being shaped into a toroidal condition.

In a first embodiment shown in FIGURES 1 to 6, a carcass 1 (FIGURE 3) of a tire (FIGURE 4) is made in the conventional manner on a collapsible cylindrical building former (not shown), the carcass being formed from a single ply 3 of rubberised parallel steel cord fabric, the cords of the fabric being disposed at 90° to a circumferential line of the former. A pair of bead wire assemblies 4 are placed around the carcass ply, one at each end of the former, and the ends of the ply are turned around their respective bead wires in known manner. Chafer strips 5 are then applied to the sides of the carcass and are consolidated in position.

Figure 5:
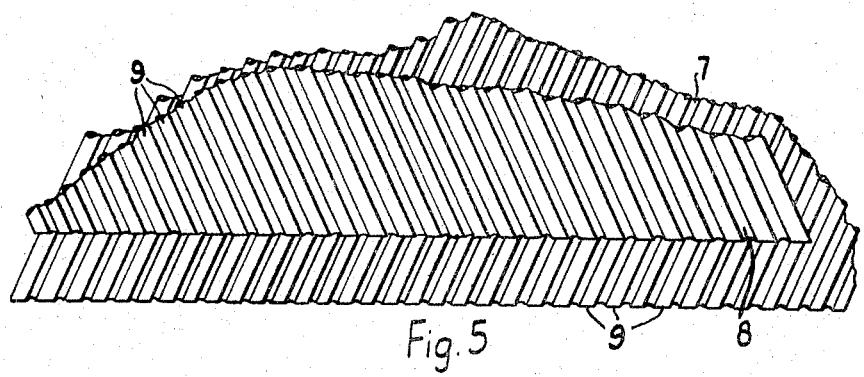
FIGURES 5 and 6 are plan views of a part of the pocket shown in FIGURES 1 to 4 showing, respectively, the disposition of the cords of the plies before stretching of the pocket and after shaping of the tire to which it is fitted.

A tread reinforcement 6 for the carcass described above comprises a pocket 6a which is constructed in the following manner:

As shown in FIGURE 1, the pocket is formed from rubberised parallel steel cord fabric which is made from two layers 7 and 8 of fabric. In each of the layers 7 and 8, the steel cords 9 are disposed at 65° to a circumferential line of the pocket, the cords of one layer being disposed at an opposite angle, with respect to said circumferential line, to that at which the cords of the other layer are disposed. FIGURE 5 shows a plan view of a part of one side of the pocket in its initial condition, with the bias cut ends of the cords 9 lying along the edges of the layers. The approximate ratio of the diameter of the pocket at this stage to the diameter which it is designed to have in the finished tire is 1:2. The approximate ratio of the width of the pocket at this stage to the width which it will have in the finished tire, measured in the axial direction of the pocket or tire, is 2:1.

As initially constructed and shown in FIGURE 1, the diameter of the pocket is less than that which the pocket should have to enable it to be fitted around the carcass 1 on the former. To increase its diameter, it is necessary to stretch the pocket in a circumferential direction. This is achieved on stretching apparatus 10 shown in FIGURE 2.

The apparatus 10 comprises a pulley 11 rotatably mounted about a horizontal axis at one end within a covered frame 12 supported upon a base plate 13. The pulley 11 is rotatable by an electric motor 14 through a chain and sprocket assembly (not shown) contained within the frame 12. A second pulley 15 is detachably and freely rotatably mounted on one end of an arm 16 said arm being pivotally mounted between its ends by a horizontal pin 17 to a vertical member 18 secured to the base plate 13, the axes of the two pulleys lying parallel and the pulley 15 being disposed directly above the pulley 11. The arm 16 is pivotally movable about the pin 17 for movement of the pulley 15 away from the pulley 11 to stretch the pocket, pivotal movement being controlled by a hand operated vertical shaft 19. The upper end of the shaft is of plain cylindrical form and is rotatably received within a block 20, itself rotatably mounted about a horizontal axis on the other end of the arm 16 from the pulley 15, and the lower end of the shaft is screw-threaded and is received in screw-threaded engagement with another block 21 rotatably mounted about a horizontal axis to the free end of a cantilever 22 which is secured to the member 18.

A visual indicator scale 23 is secured to the member 18, the scale being graduated to measure, at any instant, by means of an indicator needle 24 secured to the arm 16 the circumferential length of a pocket being stretched upon the apparatus, the graduations corresponding to different distances apart of the pulleys 11 and 15.

To stretch the pocket, it is fitted in the manner of a drive belt around the two pulleys as shown in FIGURE 2, and the electric motor 14 is driven to drive the pulleys and to drive the pocket around the pulleys. During rotation of the pulleys, the shaft 19 is rotated in the appropriate direction to move the pulleys apart thus stretching the pocket. When the pocket is of substantially the diameter required for fitting it around the carcass on the former, as shown on the indicator 23 by the needle 24, the motor 14 is stopped and the pocket is removed from around the pulleys.

Before fitting the pocket 6a to the tire carcass 1, a single thread reinforcement layer 24 (see FIGURES 3 and 4) of parallel steel cord fabric is wrapped around the crown region of the carcass. The cords of the layer 24 are disposed at a bias angle of 80° to the mid-circumferential plane of the tire carcass. The regions of the carcass to which the pocket 6a will be applied is lightly dusted with zinc stearate powder, except for a narrow band in the region of the circumferential centreline of the carcass.

The pocket is then positioned symmetrically on the tire carcass as shown in FIGURE 3, and consolidated in position only in the region overlying the narrow band of the carcass to which no zinc stearate powder has been applied. Zinc stearate powder is then applied to the outer surface of the pocket except, again, for a narrow band in the region of the circumferential centre line of the pocket, and an unvulcanised rubber tread 25 is fitted over the pocket and consolidated in position in the region overlying the narrow band of the pocket to which no zinc stearate powder has been applied. Sidewall rubber layers 26 are then fitted and the assembled tire is removed from the building former, shaped to toroidal form and moulded and vulcanised, the shaping, moulding, and vulcanising operations all being performed in a conventional diaphragm moulding press, resulting in the finished tire 2 as shown in FIGURE 4.

During shaping, the layer 24 is stretched, the stretching being produced by extending the rubber between the cords instead of by the trellising action by which the two layer pocket is stretched, so that the angle of the cords in the layer 24 are substantially unaltered.

Figure 6:
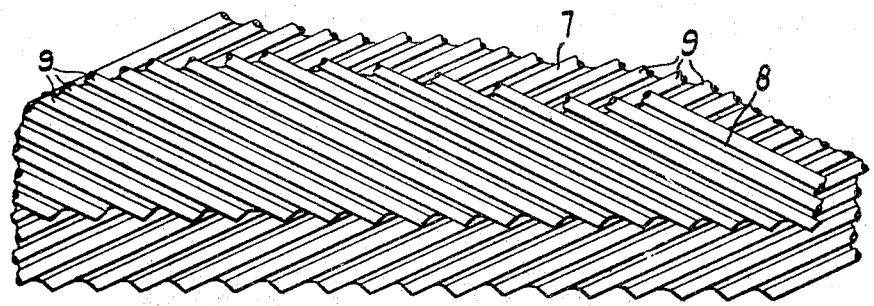

During the shaping operation, the tread reinforcement pocket is stretched from the diameter at which it was applied to the building drum to the diameter which it is required to have in the finished tire, and the bias angle of its cords is reduced to 25° as shown in FIGURES 4 and 6. The zinc stearate powder between the carcass and layer 24 on the one hand and the pocket 6a, on the other, and between the pocket and the tread, acts as a lubricant, prior to vulcanisation, to prevent adhesion between these components in the regions flanking the circumferential centre line and thus to prevent interference by such adhesion with the trellising action of the cords of the pocket and the reduction in width of the pocket on shaping.

In a modification of the method described in the first embodiment, when constructing a tire in which very large angle changes during shaping are required, the tread and tread reinforcement pocket are secured to the carcass by spikes driven through the tread and tread reinforcement and into the carcass at intervals around the circumferential centre line of the tire, these spikes being removed after shaping and before the tire is moulded.

In a further modification, two or more pockets 6a are fitted to form a tread reinforcement containing more than one pair of layers by the method described above. It is not necessary that the final bias angles of each pair of layers should be equal to the final bias angle of the other pair of layers forming the reinforcement.

In yet a further modification, two or more single layers similar to the ply 24 are included in the tread reinforcement in addition to the pocket 6a, the cords in the single layers being disposed at bias angles within the range from 65° to 90°.

Figure 7:
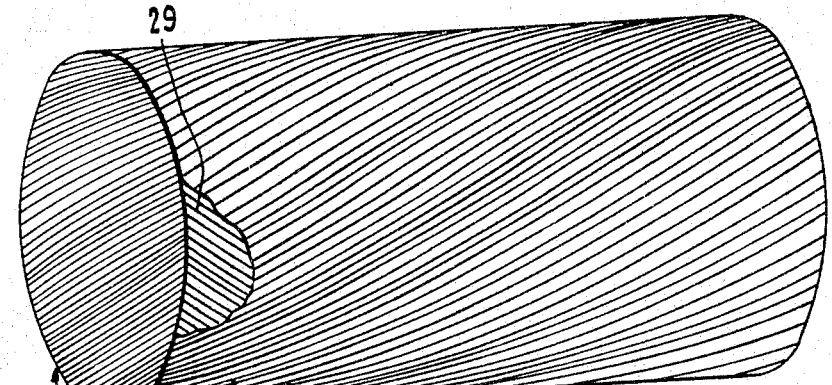
FIGURE 7 shows a second embodiment of the invention and is a view, similar to that shown in FIGURE 1, of a two steel cord ply carcass reinforcement pocket.

In a second embodiment of the invention, the production of a 7.60–15 car tire 27 (FIGURE 9) incorporating a carcass reinforcement comprising a pocket 28 (FIGURE 7) formed from two plies 29 and 30 of parallel steel cord fabric and of similar construction to the pocket 6a of FIGURE 1, is carried out by a method similar to that described in the first embodiment. In this case the plies of the pocket 28 are cut so that their cords are disposed at a bias angle of 65° to the mid-circumferential plane, which angle is complementary to the finished bias angle of 25° in the crown region of the finished tire.

Figure 8:
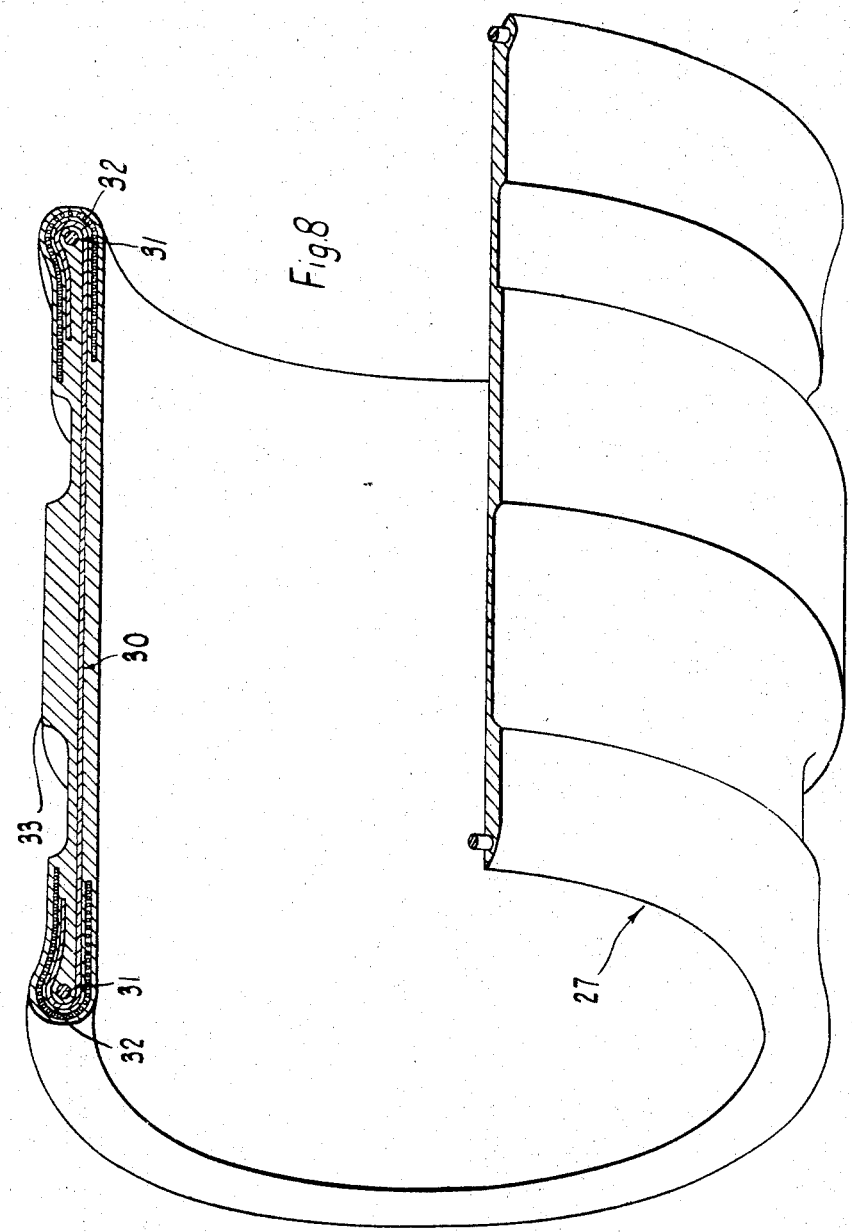
FIGURE 8 is an isometric view of an axially sectioned tire carcass built in a substantially cylindrical condition and incorporating the pocket shown in FIGURE 7.
Figure 9:
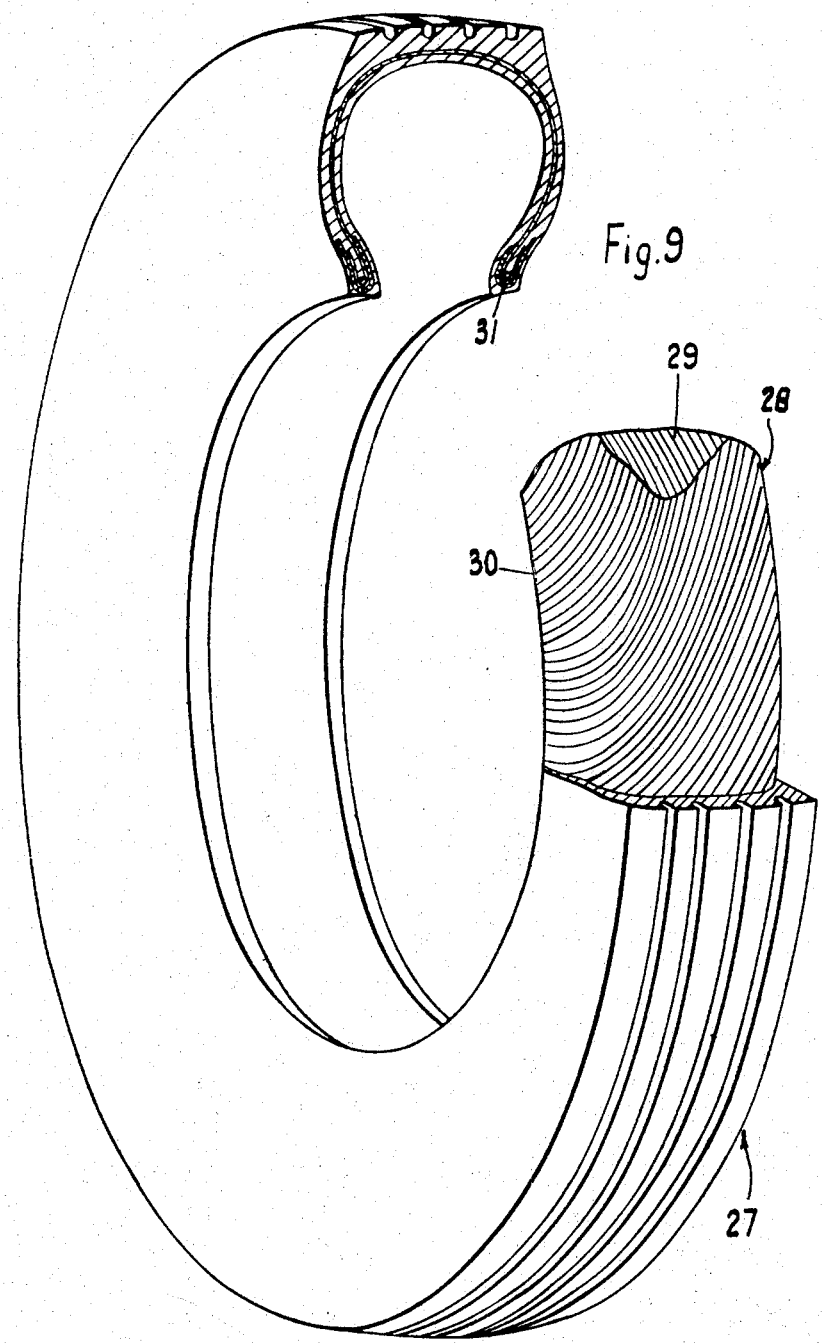
FIGURE 9 is a view similar to that of FIGURE 8 of the tire shown in FIGURE 8 after being shaped into a toroidal condition.

After stretching the pocket on the apparatus 10, shown in FIGURE 2, to the outside diameter of a cylindrical building former (not shown), the pocket is applied to the former, as shown in FIGURE 8, bead wires 31 are located in position at the ends of the former, the ends of the plies are turned around the bead wires and chafer strips 32 are added. Tread and sidewall rubber layers 33 are then located around the carcass which is removed from the former to be shaped into a toroidal condition and moulded and vulcanised as shown in FIGURE 9.

In its finished condition, the angles of the cords in the carcass reinforcement change from 65° to 25° in the mid-circumferential plane in the crown region, and to 60° in each of the bead regions.

The method of tire building according to the invention has the advantage that it may be carried out on a cylindrical building drum as in the embodiments described rather than by the use of a high-crown former; and the shaping and moulding operation may be performed in a conventional diaphragm curing press. The tire may be produced more easily and cheaply by this method than by using a high-crown former.

A further advantage of the method in accordance with the invention, when steel cord layers are used, is that when the layers to form the pocket are cut from parallel cord fabric, the bias angle at which the layers are cut is relatively high as shown in FIGURE 5, resulting in each cord being severed at an angle to the length of the cord which is nearer to 90° than would be the case if the layers were cut at the low bias angle ultimately required when the layers are built into the tire. The cords are thus more nearly "square cut" and consequently the cutting action does not expose such a large area of metal at the end of the cords as is exposed by cutting at a low bias angle. The cords are normally brass-plated to enable them to be bonded to rubber, and since the metal exposed by cutting the layers is untreated, adhesion may not be obtained between the cord ends and the surrounding rubber. The reduction in the area of metal exposed, by the use of the method in accordance with the invention, enables the cord ends to be more securely bonded to the surrounding rubber.

An additional advantage of the method in accordance with the invention is that the operation of cutting the cord layers at relatively high bias angles is easier to perform accurately than cutting at low bias angles, since the direction in which the layers are cut is at a greater angle to the direction of the cords and there is thus less likelihood of deflection of the cords by the cutting device. Also, since the layers are cut at a higher bias angle, the length of cut required to sever a layer from a sheet of given width is reduced relative to that required to sever a layer at a low bias angle from the same sheet. In practice this enables the cut to be made more quickly, and in some cases a simple guillotine may be used instead of the usual travelling rotary knife.

Whereas in the embodiments described above the cord layers are initially cut at a bias angle of 65°, equal to the complement of the desired bias angle of 25° in the finished tire, it may be advantageous, in some instances, to cut the layers at an initial bias angle somewhat greater or smaller than the complement of the bias angle in the finished tire. If the layers are cut at an angle greater than the complement, the shaping of the pocket to the desired final bias angle is made easier than in the case where the layers are cut at the exact complement. If the layers are cut at an angle smaller than the complement, the spacing between the cords of the layers in the finished state of the tire is decreased relative to the spacing between the cords in the unstretched state of the layers, resulting in an increased "compacting" together of the cords and the surrounding rubber.

Having now described my invention, what I claim is:

1. A method of building a pneumatic tire incorporating a cylinder having at least two layers of rubberised parallel cords, the cords in each ply layer being disposed in the crown region in the finished tire at a finished bias angle of between 5° and 30° to a circumferential line of the tire crossing the cords at a point under consideration, comprising initially forming said cylinder from layers in which the cords are disposed at bias angles substantially equal to the complementary angle to said finished bias angle, the cords of one layer crossing the cords of the other layer, and stretching said cylinder in the circumferential direction of said cylinder to increase the circumference of said cylinder until the bias angles of the cords of the two layers are reduced to said finished bias angle.

2. A method according to claim 1 wherein the cylinder is incorporated into the tire as a tread reinforcement element, comprising building the carcass of the tire upon a tire building former, initially forming the cylinder to a diameter less than the maximum outside diameter of the carcass upon the former, stretching the cylinder to said maximum diameter of the carcass, and applying the cylinder to the outer surface of the carcass.

3. A method according to claim 2 comprising building the carcass in an incompletely shaped condition upon the former, and, after applying the cylinder to the carcass, shaping the carcass into a toroidal condition.

4. A method according to claim 1 wherein the cylinder is incorporated into the tread reinforcement of the tire by building in an incompletely shaped condition, the carcass of a tire upon the tire building former, stretching the cylinder to substantially a diameter corresponding to a finished diameter of the tread reinforcement in the tire before moulding, disposing the cylinder in annular form coaxially and symmetrically around the tire carcass, and shaping the carcass into a toroidal condition and into engagement with the cylinder.

5. A method according to claim 1 wherein the cylinder is incorporated into the tire as a carcass reinforcement, comprising initially forming the cylinder with a circumference less than the maximum circumference of the carcass of the tire on a building former, stretching the cylinder to said maximum circumference of said carcass so as to enable the cylinder to be applied thereto.

6. A method according to claim 1 in which the initial bias angles of the cords are within a range from 10° above to 10° below the complementary angle to said finished bias angle.

7. A method according to claim 1 in which said cylinder is stretched to an increased diameter by rotation about two pulleys on parallel axes and increasing the spacing of said pulleys.

References Cited

UNITED STATES PATENTS

| | | | |
|---|---|---|---|
| 2,936,813 | 5/1960 | Haase | 156—229 X |
| 2,451,973 | 10/1948 | Kuffler | 156—126 |
| 2,517,889 | 8/1950 | Kuffler | 156—126 |
| 2,703,128 | 3/1955 | Darrow | 156—124 X |

EARL M. BERGERT, *Primary Examiner.*

HAROLD ANSHER, *Assistant Examiner.*